United States Patent

[11] 3,614,731

[72] Inventors Stephen A. Hluchan
Riverside;
Sidney Herman, Covina; Eugene G. Dowd, Rolling Hills, all of Calif.
[21] Appl. No. 46,358
[22] Filed June 15, 1970
[45] Patented Oct. 19, 1971
[73] Assignee Bourns, Inc.

[54] TRANSPORT VEHICLE AXLE BEARING ALARM
5 Claims, 7 Drawing Figs.
[52] U.S. Cl.................................................. 340/57,
340/228, 340/231

[51] Int. Cl...................................................... B60q 5/00
[50] Field of Search........................................... 340/57,
227, 228, 231, 269; 246/169; 73/342

[56] References Cited
UNITED STATES PATENTS
3,318,151  5/1967  Behrendt et al. ............. 340/57 X
2,088,485  7/1937  Schoepf et al. ................ 340/227 F UX Primary Examiner—Alvin H. Waring
Attorney—Fritz B. Peterson ABSTRACT: A system for producing an alert or alarm apprising the operator of a transport vehicle of the overheating of an axle bearing.

PATENTED OCT 19 1971
3,614,731
FIG. 1.
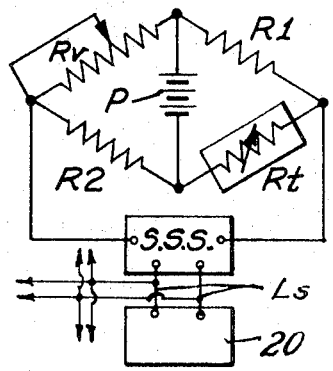
FIG. 2.
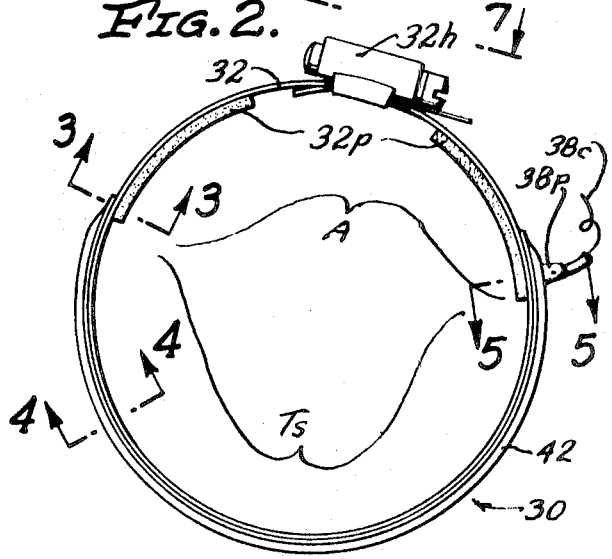
FIG. 3.
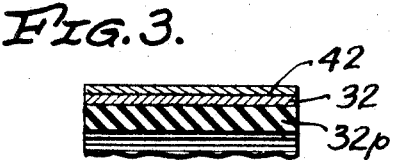
FIG. 4.
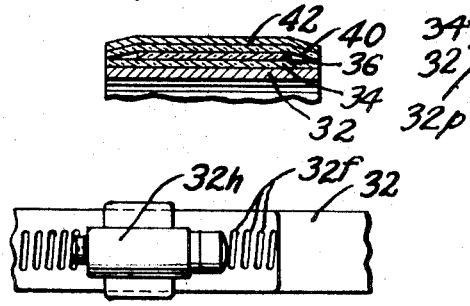
FIG. 5.
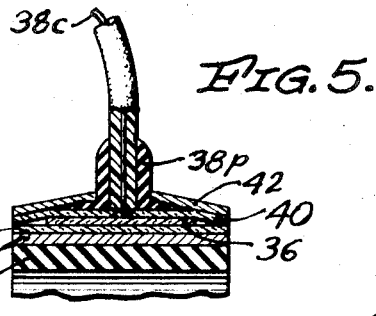
FIG. 7.
FIG. 6.
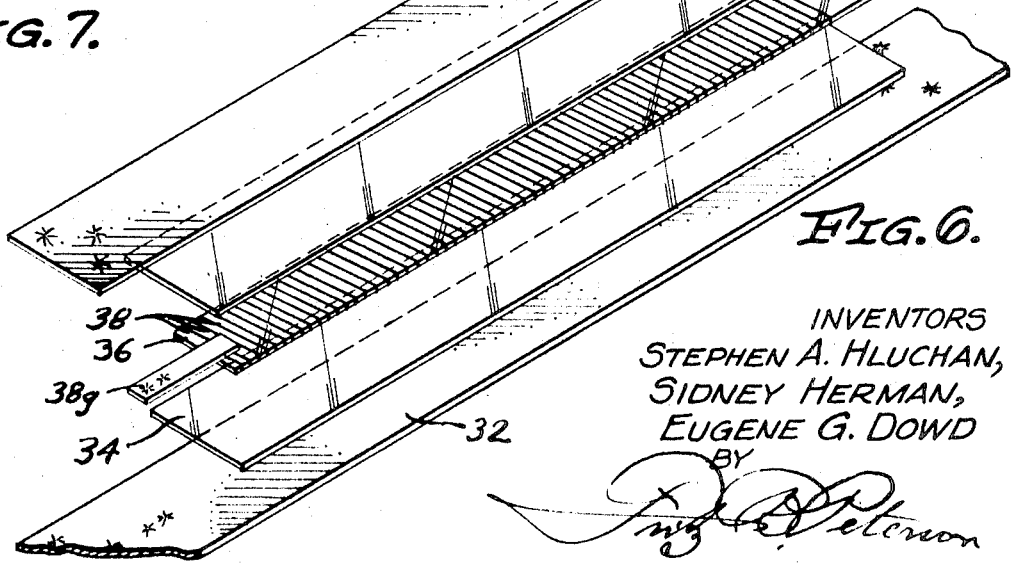
INVENTORS
STEPHEN A. HLUCHAN,
SIDNEY HERMAN,
EUGENE G. DOWD
BY

3,614,731

TRANSPORT VEHICLE AXLE BEARING ALARM

BRIEF SUMMARY OF THE INVENTION

The invention provides a means for calling attention of the operator of a transport vehicle to overheating of an axle bearing, prior to catastrophic failure of the bearing caused by continued operation of the vehicle and bearing under unfavorable conditions such as overloading, lubrication failure, excessive wear, or the like. An alarm device, such as a signaling means for producing an audible or visible signal, or a combination thereof, is connected to and arranged to be supplied energy and activated by or in response to action of circuit means responsive to unbalancing of any of a set of electrical means which includes a temperature-sensitive attachment located on a vehicle axle at or adjacent to the respective bearing to be monitored. The attachment comprises a temperature-sensitive resistive device and means for securing the resistive device in position to efficiently sense temperature changes in the bearing in the axle. The circuit means and signaling means are preferably so arranged that both a cautionary signal and a danger signal may be produced, the cautionary signal being produced when an unusually high bearing temperature below the dangerous temperature is sensed, followed by production of the danger signal when and if the bearing temperature rises to a determined value considered to be dangerous and demanding relief. The audible signaling means may be, for example, bell means, buzzer means, whistle means, or the like. Visible signaling means may be colored lamp means, flashing light means, semaphore means, or the equivalent. The electric circuit means may be such as to continue activation of the signaling means until manual operations performed by the vehicle operator, or another, terminate the signaling or initiate deenergization of the signaling means. Thus it may be assured that attention will be given to a potentially undesirable bearing condition despite only brief or momentary sensing of unusually high bearing temperature. While herein the system will be illustrated as applied to only one sensing station or region on a single axle, it will be evident that as many sensing circuit means as may be required for monitoring the many axle bearings of a vehicle may be paralleled in a connection to the signaling means, with switch means arranged to permit selection of any individual circuit means for determining which circuit means is initiating a signal, and the corresponding bearing needing attention. With the advent of heavy axle loading and high vehicle speeds, bearing failures are both more common and increasingly expensive in terms of vehicle downtime and delivery schedule failure. Detection of incipient failure of a bearing permits immediate corrective action to be taken, e.g., reduction in speed, etc. whereby expensive breakdown on the highway may be avoided and delivery of cargo accomplished without excessive delay; followed by much less expensive correction of the bearing trouble in an established vehicle station.

The preceding general and brief summary of the invention indicates that it is a principal object of the invention to provide improvements in a system or means for apprising an operator of a transport vehicle of excessive or undesirably high temperature of an axle bearing of the vehicle.

Another object of the invention is to provide means for sensing undesirable increase of axle bearing temperature in an operating transport vehicle and apprising the operator of the sensed condition.

Another object of the invention is to provide improved means for sensing undesirably high temperature of a transport vehicle axle bearing.

Other objects and advantages of the invention will be hereinafter set out or made apparent in the appended claims and the following detailed description of a preferred unit of an exemplary system according to the invention, the description containing references to the accompanying drawings forming part of this specification and in which drawings:

FIG. 1 is a schematic electrical diagram of exemplary circuit means according to the invention, partly in block diagram form;

FIG. 2 is an end elevation view of a preferred form of electrical temperature-sensing device adapted for attachment to a vehicle axle for sensing temperature of an axle bearing in the axle;

FIGS. 3 and 4 are sectional views of portions of the device illustrated in FIG. 2, the sections having been taken as indicated by directors 3—3 and 4—4, respectively, in FIG. 2;

FIG. 5 is a partial sectional view of a portion of the device depicted in FIG. 2, the section having been taken as indicated by directors 5—5 in FIG. 2, the figure showing an electrical terminal detail;

FIG. 6 is an exploded view of parts forming the preferred temperature sensor prior to close assembly and bending to arcuate form; and FIG. 7 is a plan view of the exemplary means for drawing taut and maintaining the sensing device in place on a vehicle axle.

DETAILED DESCRIPTION OF THE INVENTION

Referring first to FIG. 1 of the drawings, there is indicated an electrical bridge comprising resistive members $R1$, $R2$, $Rv$ and $Rt$, the bridge being energized by a power source P shown as a battery. Resistive elements $R1$ and $R2$ are resistors of the fixed value type. Resistive element $Rv$ is a variable resistor, preferably a screw-adjusted potentiometer or the like capable of easy adjustment and such that the adjustment is not easily or readily disturbed by other than intentional manipulations. Member $Rt$ of the network is a special device comprising a highly temperature-sensitive resistance element in the form of an insulation strip or mica or the like bearing a winding of high temperature resistance wire characterized by a very high temperature coefficient of resistivity (TCR). Very pure nickel wire, for example, may be used. Member $Rt$ of the network, as will be made clearly evident, is disposed for sensing action at or adjacent to an axle bearing, whereas the other members of the bridge network may be located elsewhere, for example in the operator's cab of the vehicle. Thus member $Rt$ will be connected, by means such as one or more suitable conductors and the vehicle frame, to the remainder of the bridge network. In those applications of the invention wherein axle bearings of one or more transport trailer vehicles are monitored concurrently with axle bearings of a tractor unit, cables and disconnect means are employed for connecting the several temperature-sensing bridge members to their respective bridge networks at the control station which is preferably in the operator's cab.

The bridge network components of each of the bridges are of values selected and adjusted to result in bridge unbalance in a selected one of two opposite states, for example, negative, until the temperature at the temperature-sensing resistive member $Rt$ exceeds a value determined to be the highest acceptable bearing operating temperature. Thus when the bridge output terminals reverse polarity (to the positive state in the examples) due to rise of bearing temperature above the determined value, an alarm signal is created and transmitted by the bridge network to a solid-state switch unit SSS (FIG. 1). The latter, which may be a triggerable DC switching circuit such as that described at pages 110—111 of the General Electric Company "SCR Manual," third edition, published by the Rectifier Components Division of that company, West Genesee Street, Auburn, New York, or which may be a like known circuit using other solid-state components. The SSS unit, when thus provided a "positive" signal, switches power to an alarm unit 20 which in turn produces one or more sense-perceptible signals to warn the vehicle operator of the dangerous condition of the bearing.

Since it is optional with the vehicle owner whether all axle bearings of a vehicle or vehicle-combination are to be monitored, or only certain sets of such bearings, only one temperature-sensing unit and associated triggerable switch unit SSS, and one alarm unit 20, have been illustrated in detail. As is evident, a plurality of similar sensing units and associated switching units are in the system connected in parallel, through a shorting selecting switch, to the alarm unit 20. Such parallel-connected units are indicated by the branch signal lines connected to the signal leads Ls connecting the switch unit SSS to the alarm-producing unit 20. Thus when the alarm is produced, the operator may, by successively shorting out the incoming signal lines, readily determine which bearing is at fault. Preferably, the switching unit SSS is of the type in which triggering of a solid-state switching device such as an SCR results in continued energization of the alarm unit 20 until a circuit-opening switch, such as a pushbutton switch, is operated by the vehicle operator.

The alarm unit 20 may comprise an electric bell, a red lamp with or without a flasher circuit, or other audible or visible indicator means, or any combination of such means.

Referring to FIGS. 2-7, inclusive, the bearing temperature sensor device 30 is shown to comprise an electrical temperature-sensitive portion Ts and an auxiliary portion A (FIG. 2). To support and hold the sensitive member affixed in operating attitude on the vehicle axle at the appropriate location, the device comprises a strong flexible band device 32 of heat-conductive alloy, one end of which has secured thereto a head 32h comprising a clamp housing and a tightening worm whose thread engages with a ladder formation 32f (FIG. 7) disposed along a portion of the other end of the band. The band device thus is or may be substantially like or similar to band clamps used for securing an end of a flexible tube or hose to an end of a rigid conduit, the band being modified to an extent hereinafter indicated. When the band is extended or brought around the axle and the ends of the band are conjoined with the thread of the worm engaged with the ladder track, the band is generally of circular form and is thus adapted to snugly engage the axle and be brought into firm and secure attachment thereto by turning of the worm, in known manner. As an aid in maintaining the band 32 of the sensor device in position as applied encircling an axle (not shown) of the vehicle, one or more elastic pads such as 32p, preferably of synthetic rubber or like heat-resistant material, are adhesively united to the inner surface of the band in portion A of the device as indicated in FIG. 2.

The band 32 of the sensor device 30 supports and has affixed thereto an armored resistive device comprising a first insulator 34 of strip form, preferably of mica, an insulation card 36 preferably of mica and bearing a winding 38 of resistance wire characterized by high TCR, a second insulator strip 40 of mica, and a covering armor strip 42. As indicated in FIG. 6, one end of the resistance wire 38 is fusion united, as by welding, to a grounding strip 38g which in turn is spotwelded to band 32. The other end of the resistance wire is welded to an insulated and shielded conductor 38c whose end portion is encased in an elastic plug 38p whose flat base is pressed against card 36 and whose reduced exposed end extends through apertures formed in insulator strip 40 and armor strip 42 as indicated in FIG. 5. Thus an extended terminal with insulated armored lead is provided for the "high" or ungrounded end of the resistance wire. As will be evident to those using the invention, both ends of the resistance wire may be terminated by connection to respective insulated leads; and the leads separately brought out, or alternatively, brought out through the same grommetlike plug 38p. In the latter case, the distant end of wire 38 is brought back by adding a separate additional strip of mica between the winding and armor strip 42. However, the simpler and less expensive mode of terminating one end by grounding to the vehicle frame is the presently preferred alternative mode.

In assembling the temperature-sensing portion Ts of the sensor device 30, the band 32 is curved to approximately the final curvature desired, and maintained in that attitude while the strips 34, 36, 40 and 42 are successively brought into juxtaposition on the inner surface of the band. While thus held, termination tab 38g is welded to the band, and the armor strip 42 is similarly welded at its ends to the band as indicated by the spot-welding symbols on the band and strip. Preferably, whereby to better protect the resistance wire from adverse effects of foreign matter, the edge portions of the strips are coated with high-temperature cement such as a high-temperature epoxy resin. As is evident and as is indicated to exaggerated scale in the sectional views of FIGS. 4 and 5, the armor strip and the strip 40 of insulation may be longitudinally crimped or formed with a crown, whereby the resistance element comprising strip 36 and wire 38 are further covered and protected.

While for the purposes of illustration, the simplest form of units according to the system have been shown and in the interest of brevity, the more complex forms merely described or mentioned, it will be evident that temperature-sensor devices of other shapes may in instances be required and may be formed accordingly, and that the SSS unit or units may be made to sense not only the temperature at which bridge polarity reverses but also, subsequently, a higher temperature at which the bridge output signal voltage reaches a second value at which a voltage-sensitive circuit in the SSS unit activates a further or additional alarm means indicating a near destructive temperature level in the bearing. And, while in the interest of brevity of description and illustration, and because of the wide variety of constructions of the portions of a vehicle to which the described components are attached and with which they cooperate, those conventional structures are not shown nor described in detail. The application of the components and arrangement thereof are made evident to those skilled in the transport vehicle manufacturing art. Further, in the light of the preceding description and explanation, other modifications within the true spirit of the invention will occur to others.

Accordingly, we claim:

1. A transport vehicle axle bearing alarm system for alerting operating personnel to increase of temperature of an axle bearing to a value above a determined temperature value, said system comprising, in combination with a transport vehicle axle, first means, including support means constructed and arranged for attachment to the vehicle axle adjacent an axle bearing, said first means also including a temperature-sensitive electrical resistor means;

second means, including electric bridge means in which said resistor means is connected, and means for supplying electrical power to said bridge means to produce alternatively an output of either of opposite polarities depending upon the state of unbalance of the bridge means;

third means, including solid-state electronic switching means connected to said bridge means and arranged to normally produce no effective output signal in response to unbalance of said bridge to a selected state by said resistor means responding to a temperature within a temperature range below a selected value indicative of a safe bearing operating temperature, and arranged to produce an output signal in response to unbalance of said bridge to the opposite state by said resistor means responding to a temperature above said selected value and indicative of a bearing operating temperature above said safe temperature; and fourth means, connected to said third means and responsive to production of an output signal thereby to produce a sense-perceptible alarm to apprise the vehicle operator of rise of bearing operating temperature to a value above said safe operating temperature.

2. A system according to claim 1, in which said first means includes an arcuate band, means to tension said band to draw the same into snug engagement with said axle, and means secured to said band to enclose and protect said resistor means and maintain the latter in close proximity to said axle whereby to permit the resistor to efficiently sense the temperature of the axle at the area of engagement.

3. A system according to claim 1, in which said first means comprises in superimposed relation, an arcuate tension band, an insulation strip on an inner surface area of said band, a resistance wire and card unit in strip form, a second insulation strip, and a metal armor cover strip overlying the said strips and secured at its ends to said tension band.

4. A system according to claim 1, in which a plurality of said first means are arranged in functional relationship with respective ones of a plurality of vehicle axles, and said system including for each of said first means and in functional association therewith, a respective one of said second means and a respective one of said third means, all of said plurality of said third means being connected in parallel to said fourth means.

5. A system according to claim 4, including in said fourth means, shorting switch means for shorting each parallel connection thereto from one of said third means, whereby determination may be made of which of the plurality of first means is indicating an axle bearing above said safe operating temperature.